United States Patent [19]

Reens

[11] 4,029,199
[45] June 14, 1977

[54] OVERHEAD CONVEYOR AND GUIDE LOOP

[75] Inventor: Frank D. Reens, Grand Rapids, Mich.

[73] Assignee: Planet Corporation, Lansing, Mich.

[22] Filed: Sept. 15, 1975

[21] Appl. No.: 613,067

[52] U.S. Cl. .............................. 198/678; 198/835; 198/840

[51] Int. Cl.² ....................................... B65G 15/60

[58] Field of Search .......... 198/137, 177, 203, 209, 198/840, 678, 835; 104/93, 118, 119

[56] References Cited

UNITED STATES PATENTS

| | | | |
|---|---|---|---|
| 1,699,538 | 1/1929 | Keller et al. | 198/209 |
| 2,796,975 | 6/1957 | DaCosta | 198/203 |
| 3,623,599 | 11/1931 | Tillman | 198/209 |

*Primary Examiner*—Evon C. Blunk
*Assistant Examiner*—Douglas D. Watts
*Attorney, Agent, or Firm*—McGarry & Waters

[57] ABSTRACT

An overhead conveyor with an improved guide for a spray booth loop and other arcuate track portions. The guide is an annular ring which bears against the conveyor chain and which is rotatably supported for movement with the conveyor chain by a first set of rollers which contacts the undersurface of the annular ring, a second set of rollers which contacts an inner circular flange of the annular ring and a third set of rollers which contacts a top surface of the annular ring.

11 Claims, 4 Drawing Figures

OVERHEAD CONVEYOR AND GUIDE LOOP

BACKGROUND OF THE INVENTION

1. Field of the Invention:

This invention relates to conveyor apparatus. In one of its aspects, the invention relates to a conveyor apparatus having a curved arcuate section with a rotatable annular guide to smoothly guide the conveyor around the arcuate section.

2. State of the Prior Art:

Overhead conveyor systems are used extensively in industrial manufacturing operations to carry individual parts through treating processes such as paint spraying. Typically, the conveyor forms a plurality of loops of about 270°, which loops are surrounded by a paint spray booth. Heretofore, the conveyor chain was guided through the loops with guide rollers which were in rolling contact with the chain. The use of such guide rollers resulted in an undesirable surging action of the chain which rocked the parts as they passed through the spray booth. Such rocking of the parts resulted in uneven paint application and nonuniform coatings on the articles.

Conveyor chains have been heretofore guided around corners by rims which are rotatably supported on a central shaft. However, such rims are not useful in spray booths and the like because the central portion of the spray booths must be free and open for vertical movement of the paint spray equipment.

SUMMARY OF THE INVENTION

According to the invention, an improved guide means is provided for an overhead conveyor apparatus having a track forming a closed loop, at least a portion of which track forms an arcuate track portion. The conveyor is supported on the track and the conveyor includes wheels which roll on the track and supports which are secured to the wheels. Flexible connectors, such as a chain, connect each of the supports to an adjacent support to form a closed loop.

The improved guide is positioned in engagement with the work supports and/or flexible connectors therebetween for guiding the work supports around the arcuate track portion. The guide is a ring having a circular outer circumferential surface which engages the work supports and/or the flexible connectors. Means mount the circular guide ring for rotation about an axis substantially coincidental with the center of curvature of the arcuate track portion so that the circular guide ring rotates as the conveyor passes through the arcuate track portion. The center of curvature of the arcuate track portion and the circular guide ring is free from any structural interference from the mounting means to allow spray equipment to vertically more therethrough. In this manner, the conveyor is smoothly guided through the arcuate track portion.

The circular guide ring desirably has outer and inner circular vertical flanges separated by a horizontal annular connecting web. The guide ring mounting means comprises a first plurality of rollers mounted for rolling contact with an undersurface of the guide ring horizontal annular web and a plurality of second rollers mounted for rolling contact with an inner surface of the inner vertical flange thereof. A third plurality of rollers are mounted for rolling contact with an upper surface of the horizontal annular web.

Desirably, means are provided for adjusting the position of the second roller so that the horizontal position of the circular guide ring can be adjusted with respect to the track.

Typically, the arcuate track portion forms an arc in excess of 180° and generally about 270° and the track guides the conveyor through a spray booth.

BRIEF DESCRIPTION OF DRAWINGS

The invention will now be described with reference to the accompanying drawings in which.

DESCRIPTION OF THE PREFERRED EMBODIMENT

Figure 1:
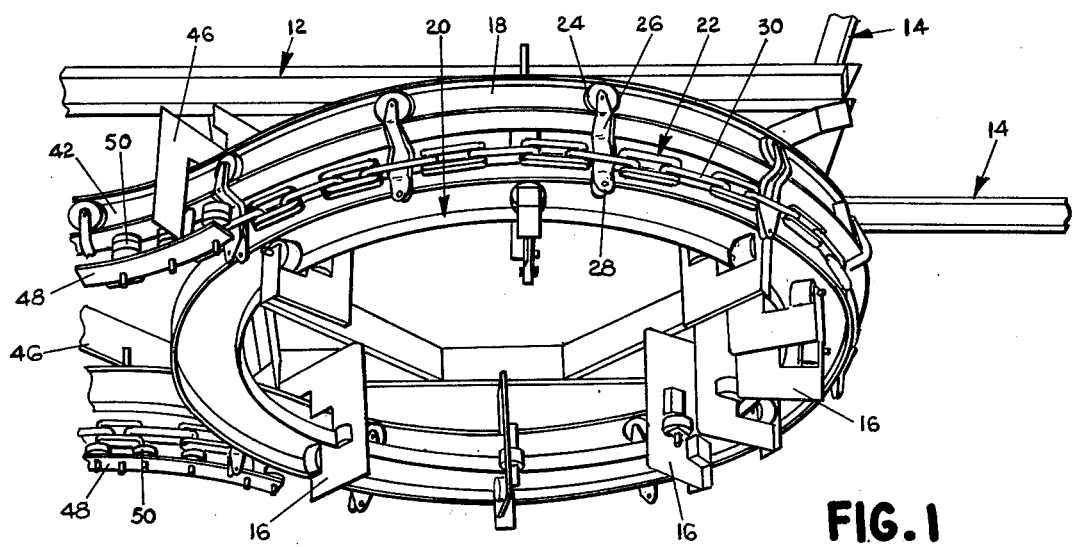
FIG. 1 is a perspective view of a portion of a conveyor system which embodies the conveyor loop according to the invention.

Referring now to the drawings, and to FIG. 1 in particular, there is shown a conveyor loop which forms a portion of a conveyor system. The conveyor system is closed or continuous in conventional fashion and the loop may be enclosed by a spray booth, or other treatment area. A supporting frame 12 is secured to a building gridwork 14. A plurality of support brackets 16 are secured to the underside of the supporting frame 12 in a generally circular fashion. An I-beam roller track 18 is welded to certain of the support brackets 16 and forms an arcuate track portion. An annular guide ring 20 is rotatably supported through sets of guide rollers on the support brackets 16 for rotation about an axis coincidental with the center of curvature of the arcuate track portion. An overhead trolley conveyor 22 is supported in conventional fashion from the I-beam roller track 18. Thus, the overhead trolley has wheels 24 which roll on the I-beam roller track 18 and depending arms 26 which are secured to the wheels 24. The arms 26 have at the lower portion work supports 28 through which various items to be painted or otherwise threated are hung. A chain 30 couples the depending arms 26 together in conventional fashion and bears against an outer edge of the guide ring 20 as the conveyor chain passes around the conveyor loop. The conveyor chain is driven by conventional means (not shown) to move the chain through the conveyor loop.

Figure 2:
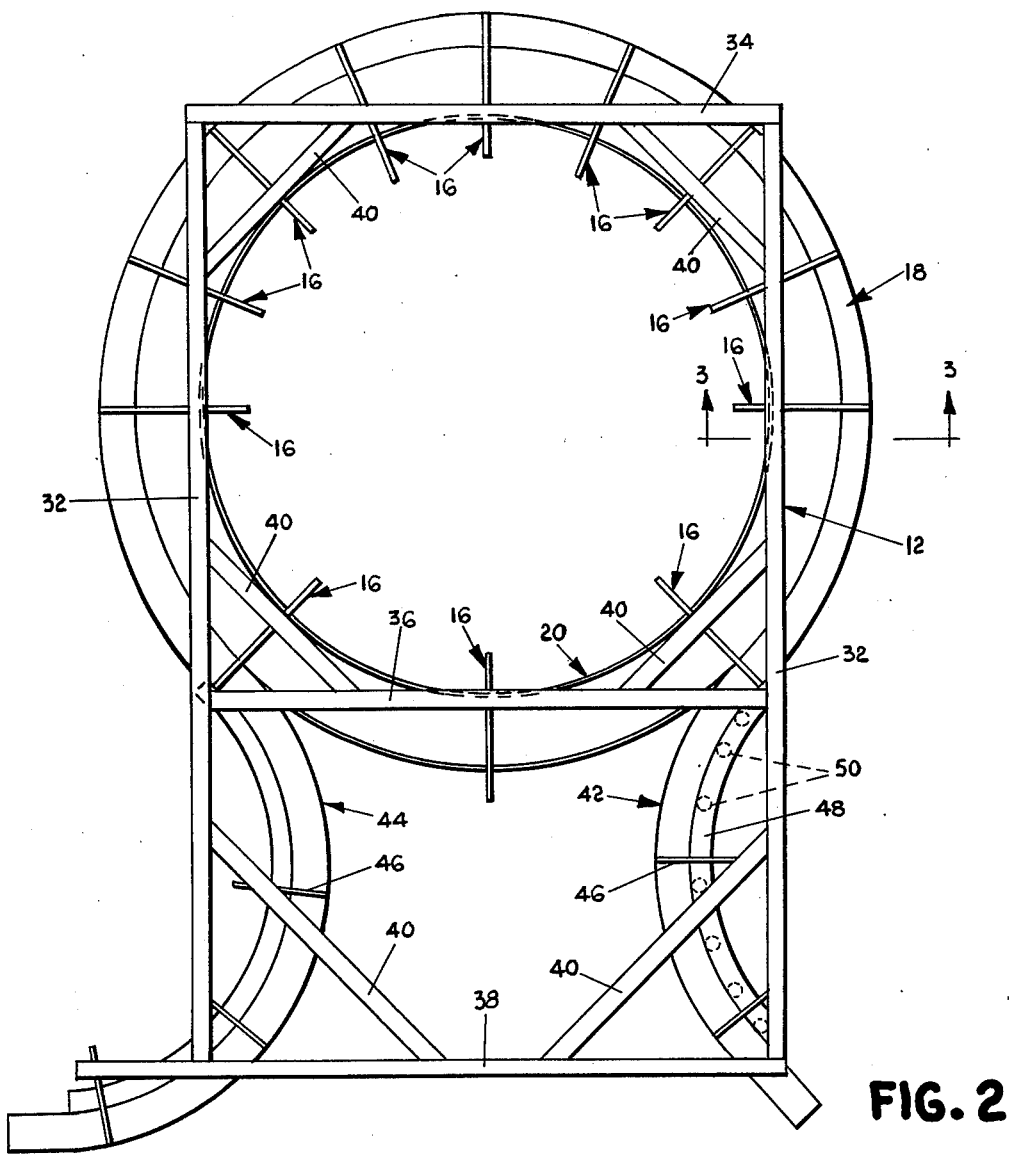
FIG. 2 is a top view of the conveyor loop illustrated in FIG. 1.

Referring now to FIG. 2 as well as to FIG. 1, the supporting frame 16 is composed of a pair of elongated channel beams 32 and crossbeams 34, 36 and 38. Corner braces 40 are secured between various of the elongated beams 32 and the crossbeams 34, 36 and 38 to rigidify the supporting frame.

A curved entrance track 42 and a curved exit track 44 are joined to the I-beam roller track 18 to provide a smooth transition between other portions of the overhead track and the circular conveyor loop. Support brackets 46 are secured to the underside of the frame 12 to support the curved entrance and exit tracks 42 and 44 respectively. Further, curved roller mounting channels 48 having the shape of the entrance and exit tracks 42 and 44 are mounted on the support brackets 46 beneath the entrance and exit tracks. Guide rollers 50 are rotatably mounted on a vertical axis within the mounting channels 48 to guide the chain around the entrance and exit tracks 42 and 44.

Figures 3, 4:
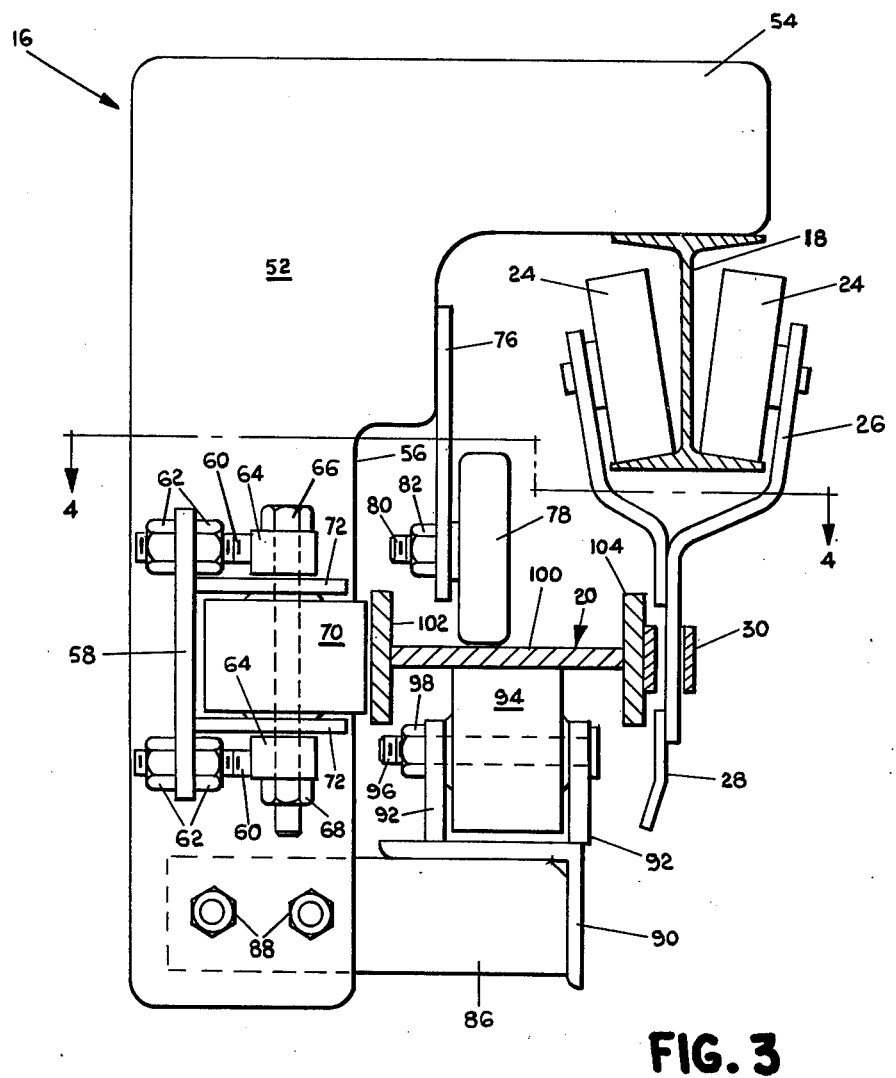
FIG. 3 is a partial sectional view seen along lines 3—3 of FIG. 2.
FIG. 4 is a partial sectional view seen along lines 4—4 of FIG. 3.

Reference is now made to FIG. 3 for a description of the roller mounting system for the guide ring 20. For purposes of simplicity, only one bracket and roller guide system will be described. Multiple brackets mounting identical roller guide systems are used, however, to support and guide the entire guide ring.

The bracket 16 has a main vertical central portion 52 and a projecting arm 54 at the top portion thereof. The central portion 52 is idented at 56 to provide an opening for the guide ring 20. As seen in FIG. 3, the I-beam roller track 18 is supported from the projecting arm 54 of the bracket 16. The roller track can be welded in conventional fashion to the projecting arm 54.

A pair of lateral support arms 58 are welded to the central portion 52 of bracket 16. These lateral support arms 58 extend substantially vertical from the plane of the bracket 16 and support at top and bottom portions threaded bars 60. Nuts 62 secure each of the threaded bars 60 to the lateral support arms 58. Collars 64 are provided on one end of each of the threaded bars 60. Stud shafts 66 extend through the collars 64 to rotatably mount inside bearing rollers 70. A slotted bracing plate 72 is secured to the central portion 52 of the support bracket 16 and to the lateral support arms 58 to provide proper bracing and to provide additional rigid support and bracing for the inside bearing rollers 70. As seen in FIG. 4, slots 74 are provided in the plates 72 in a direction parallel to the axis of the threaded bars 60.

The inside bearing rollers 70 can be adjusted radially with respect to the annular rotatable guide ring 20 by adjusting the position of the nuts 62 on the threaded bars 60. Such adjustment will result in movement of the bars 60 radially toward or away from the guide ring 20. During such movement, the stud shafts 66 will move within the slots 74 of the slotted plates 72. Thus, adjustment of the bearing rollers 70 can be used to adjust the guide ring 20 positioned with respect to the overhead roller track 18 for proper adjustment of the guide ring 20. Further, the adjustment of bearing rollers 70 can be used to reduce slop or slack in the guide ring.

An upper roller guide assembly for the ring 20 is provided by a depending rolling bracket 76 which is welded to an outer edge of the central portion 52 of bracket 16. A stud shaft 80 extends through the top bearing roller 78 and through a bottom portion of the depending roller bracket 76 to secure the top bearing roller 78 to bracket 76. A nut 82 is provided on the end of stud shaft 80 for this purpose. The upper bearing roller 78 bears against the upper surface of the guide ring 20 to firmly hold the guide ring down against the bottom set of rollers.

A bottom roller assembly is supported from the bottom portion of the support bracket 16. The bottom roller assembly comprises lateral brackets 86 which are secured by bolts 88 to the bottom portion of the bracket 16, angle iron brackets 90 which are secured to the other end of the lateral brackets 86 and vertical roller supports 92 which are welded to the top of the angle iron brackets 90. The roller supports 92 mount the bottom support rollers 94 through stud shaft 96 and nut 98.

The rotatable guide ring 20 is I-shaped in configuration having a horizontal web 100, an inner bearing ring 102 and an outer bearing ring 104. As seen in FIG. 2, the radius of the outer bearing ring is slightly less than the radius of curvature of the arcuate track portion. However, the radius of curvature can be of any size so long as it smoothly guides the work supports around the conveyor loop.

In operation of the conveyor loop according to the invention, the chain 30 is driven by conventional means (not shown). The rollers for the conveyor follow a path defined by the entrance track 42, the I-beam roller track 18 and the exit track 44. The chain 30 generally follows the rollers but would ordinarily, without suitable guide means, be drawn inwardly as it passes around the conveyor and accordingly substantial undesirable slack would occur in the chain. Tension is maintained in the chain according to the invention by the guide ring 20. Thus, as the chain 30 passes around the conveyor loop, it and the work supports 20 bear against the outer bearing ring 104 of the guide ring 20. Bearing rollers 70, 78 and 94 support the guide ring 20 for rotation about a vertical axis so that the guide ring 20 rotates with the chain as the chain passes around the conveyor loop. As illustrated in FIG. 3, the inner bearing ring 102 bears against the inside bearing rollers 70. The bottom support rollers 94 bear against the bottom of web 100 to support the ring 20 for rotation about a vertical axis. Top bearing rollers 78 bear against the top of the web 100 to assure that the ring 20 maintains its horizontal orientation.

The guide ring 20 thus provides a smooth vehicle by which the overhead trolley assembly moves through the conveyor loop, whereby avoiding vibrations and jerky chain movement which may result from other types of roller guide systems. The chain can be drawn very tight for positive drive without surging with the use of the guide ring.

Whereas the invention has been described with reference to a guide ring in contact with the roller chain as a preferred embodiment of the invention, conceivably, the guide ring can be raised or lowered with respect to the chain so that the guide ring contacts only the work supports. The guide ring will function in the same manner so long as the chain remains taut and the work supports are smoothly guided around the conveyor loop.

Reasonable variation and modification are possible within the scope of the foregoing disclosure and drawings without departing from the spirit of the invention which is defined in the accompanying claims.

The embodiments of the invention in which an exclusive property or privilege is claimed are defined as follows:

1. In an overhead conveyor apparatus having:
    a track forming a closed loop, at least a portion of said track forming an arcuate track portion;
    a continuous conveyor supported by said track, said conveyor including wheels which roll on said track, work supports secured to the wheels and flexible connectors connecting each of the supports to an adjacent support; and
    guide means in engagement with the work supports for guiding the work supports around the arcuate track portion to maintain the conveyor in a taut condition;
    the improvement in said guide means comprising:
    a circular guide ring having a circular outer circumferential surface and a completely open central portion free from structural interference from the guide means mounting structure and adapted to allow spray equipment to pass vertically therethrough;

means inwardly of said guide ring circumferential surface at said arcuate track portion for mounting said circular guide ring for rotation about an axis coincidental with the center of curvature of the arcuate track portion and for maintaining said guide ring in a predetermined lateral position, said mounting means positioning said circular guide ring circumferential surface in contact with at least the work supports so that said circular guide ring rotates as said conveyor passes through said arcuate track portion;

said mounting means and said maintaining means defining a completely open central area including at least portions of said guide ring open central portion to allow spray equipment and the like to pass therethrough;

whereby said conveyor is smoothly guided through said arcuate track portion.

2. A conveyor apparatus according to claim 1 wherein said guide ring mounting means comprises a plurality of rollers supported for engagement with an underside of said circular guide.

3. A conveyor apparatus according to claim 2 and further comprising means for adjusting the lateral position of said circular guide ring with respect to said arcuate track portion.

4. A conveyor apparatus according to claim 2 wherein said guide mounting means further comprises a plurality of rollers supported for engagement with an upper surface of said circular guide ring.

5. A conveyor apparatus according to claim 2 wherein said circular guide ring has an inner vertical guide flange, and said means for maintaining the lateral position of said circular guide ring further comprises a plurality of rollers supported in said open central portion for rolling contact with said inner guide flange.

6. A conveyor apparatus according to claim 1 wherein said circular guide ring has an outer circular vertical flange and an inner circular vertical flange joined by a horizontal annular web.

7. A conveyor apparatus according to claim 6 wherein said guide ring mounting means comprises a plurality of first rollers mounted for rolling contact with an underside of said guide ring horizontal annular web, and said lateral maintaining means comprises a plurality of second rollers mounted for rolling contact with an inner surface of said inner circular vertical flange.

8. A conveyor apparatus according to claim 7 and further comprising means for adjusting the position of said second rollers to adjust the horizontal position of said circular guide ring with respect to said arcuate track portion.

9. A conveyor apparatus according to claim 7 wherein said guide ring mounting means further comprises a third plurality of rollers mounted for rolling contact with an upper surface of said horizontal annular web.

10. A conveyor apparatus according to claim 9 wherein said arcuate track portion forms an arc in excess of 180°.

11. A conveyor apparatus according to claim 1 wherein said arcuate track portion forms an arc in excess of 180°.

* * * * *